UNITED STATES PATENT OFFICE.

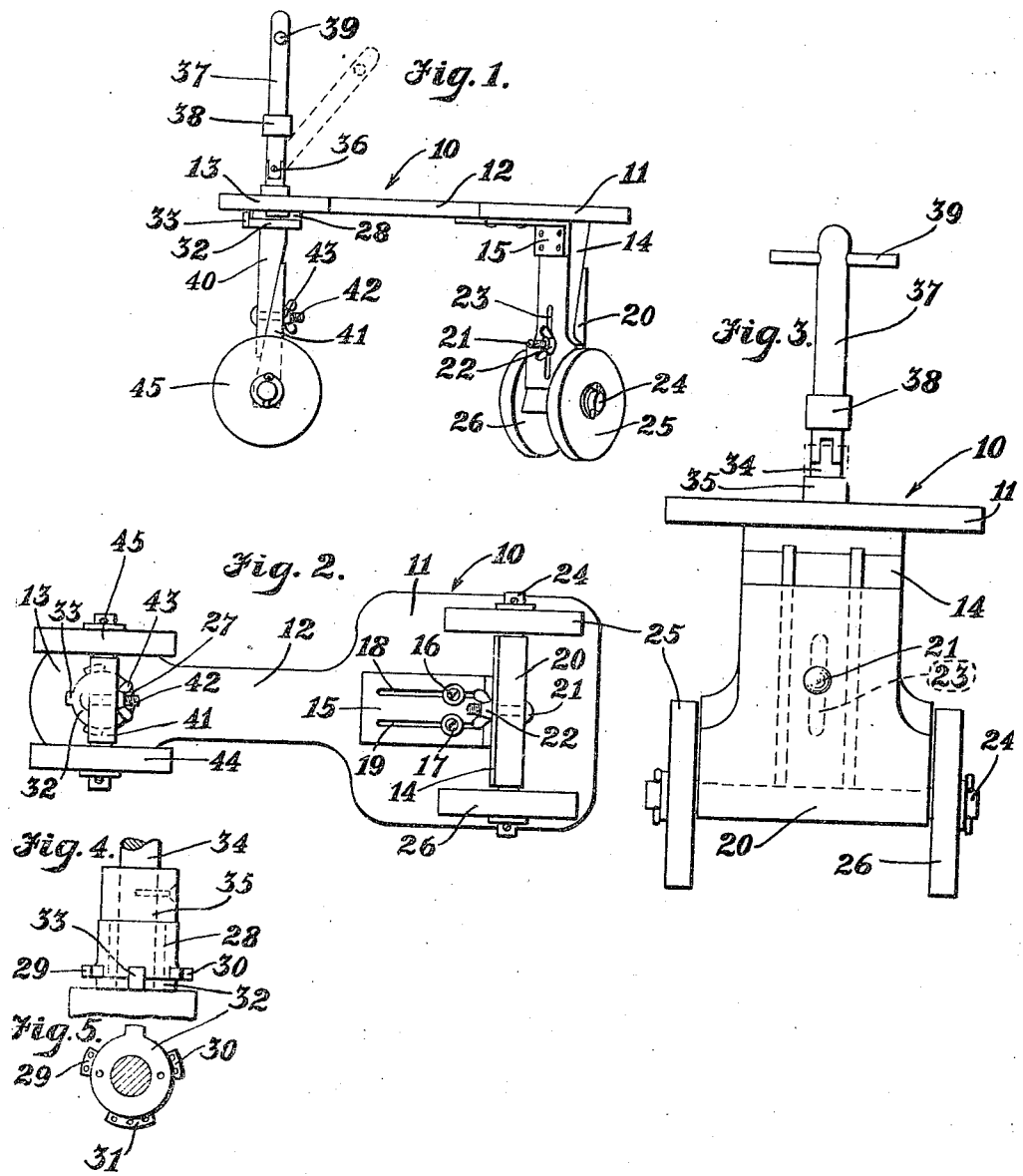

CHARLES E. HAMS, OF BURBANK, CALIFORNIA.

CHILD'S VEHICLE.

1,279,540.

Specification of Letters Patent.  Patented Sept. 24, 1918.

Application filed May 28, 1917. Serial No. 171,556.

*To all whom it may concern:*

Be it known that I, CHARLES E. HAMS, a citizen of the United States, residing at Burbank, in the county of Los Angeles and State of California, have invented new and useful Improvements in Children's Vehicles, of which the following is a specification.

My object is to make a child's vehicle which may readily be adjusted to accommodate children of various sizes, and to provide means by which the tongue may be secured in an upright position or permit it to swing free, and to provide means for limiting the turning movement of the front wheels, to reduce the liability of up-setting the vehicle.

The invention is illustrated, by way of example, in the accompanying drawings in which:

Figure 1 is a view in perspective and side elevation illustrating the vehicle.

Fig. 2 is a view in plan, as seen looking at the under side of the vehicle, and particularly disclosing the construction of the running gear.

Fig. 3 is an enlarged view in rear elevation illustrating the vehicle body and the adjustable mounting of the rear axle thereupon.

Fig. 4 is a view in side elevation illustrating the swivel sleeve as disassociated from the vehicle body.

Fig. 5 is a view in end elevation illustrating the swivel members shown in Fig. 4.

Referring more particularly to the drawings, 10 indicates the vehicle body, here shown as comprising a single flat piece. The rear end of this piece is enlarged to form a seat 11, which is connected by a narrow portion 12 to the front swivel end 13. Positioned beneath the rear end of the vehicle is an axle support 14. This support has an angle plate 15 fastened to its front side and by which it is adjustably secured to the vehicle body. The adjustment of the plate is afforded by means of a pair of bolts, or screws 16 and 17 which extend downwardly from the lower face of the vehicle body and through parallel slots 18 and 19 formed through the horizontal leg of the angle plate. The axle supporting member 14 has a straight front face and a diagonal rear face against which the diagonal front face of an axle bearing 20 is adjustably secured. This adjustment is afforded by a bolt 21 upon which a wing nut 22 is mounted. The bolt is fastened to the axle bearing and extends through a slot 23 vertically disposed within the axle support 14. The axle bearing 20 is suitably fastened to an axle 24 upon which wheels 25 and 26 are rotatably secured. It will be understood that by the vertical adjustment of the members 14 and 20 in relation to each other and the adjustment of the angle plate 15 in relation to the seat, that the wheels 25 and 26 may be disposed at various points beneath the seat of the vehicle body and at given distances therebelow.

The swivel end of the vehicle body is formed with a central opening 27, through which a sleeve 28 extends. This sleeve is formed with the lugs 29, 30 and 31 by which it is fixed to the under face of the body. Mounted to rotate within the sleeve is a hub 32 having an annular lower flange which extends outwardly beneath the lower end of the sleeve 28 and supports the weight of the forward end of the vehicle. A stop lug 33 is formed upon this flange and extends upwardly between the lugs 29 and 30 of the sleeve, as particularly shown in Fig. 4 of the drawings. This limits the swinging movement of the hub within the sleeve. Positioned within the upper end of the hub is a steering post 34 around which a supporting collar 35 is fastened. This collar overlaps the upper face of the sleeve 28 and prevents the accidental removal of the steering post from the vehicle body. A hinge pin 36 passes through the steering post and pivotally supports a tongue 37 which may be swung vertically, and also may be locked in a rigid vertical position by a sliding sleeve 38. A handle 39 is fastened through the end of the tongue and aids in steering the vehicle.

The steering post extends through the hub 32 and is formed integral with a front axle support 40. This support has a beveled rear face against which a beveled face of a front axle bearing 41 is clamped. The clamping operation is performed by a bolt 42 and a wing nut 43, the bolt extending through a slot in the front axle bearing. Positioned in the lower end of the axle bearing 41 are front wheels 44 and 45 by which the front of the vehicle body is supported.

In operation, the child sits on the seat portion of the body and astride the reduced neck portion 12 so that the feet may bear upon the ground. The axle supports 14 and 40 are adjusted in relation to the bearings 20 and 41 by the bolts 21 and 42, respectively. This permits the feet of the child to rest in a natural position upon the floor so that the vehicle may be easily shoved along. It will be noted that guide ribs 48 and 49 extend parallel to each other along the inclined faces of the members and prevent side movement. In case the wheel base of the vehicle is too short to properly support the child, the rear axle and its supporting members may be moved in or out, and locked in position by the bolts 16 and 17. The tongue may either be held rigid, as shown in full lines in Fig. 3, or may be inclined, as shown by the dotted lines in Fig. 1. When the tongue is rigid and vertical the sleeve 38 will be slid down over its hinge joint with the steering post 34. As the vehicle is guided the turning movement of the front wheels will be limited by the stop 33 as it encounters the lugs 29 and 30.

It will thus be seen that the vehicle here disclosed may be easily adjusted to suit the requirements of children of various ages and sizes and that will support the child in a manner to prevent the turning over of the vehicle.

While I have shown the preferred form of my child's vehicle as now known to me, it is evident that various changes in the combination, construction and arrangement of parts may be made by those skilled in the art without departing from the spirit of my invention.

I claim:

1. A flat vehicle body, an angle plate having longitudinal parallel slots, bolts inserted through the slots into the body, so that the plate may be adjusted forwardly or backwardly relative to the body by manipulating the bolts, and an axle support secured to the angle plate at right angles to the body.

2. A flat vehicle body having a vertical opening, a sleeve fixed in the opening, a hub rotatably mounted in the sleeve, a flange extending from the hub below the sleeve to support the sleeve, a stop lug upon the flange and extending upwardly, and spaced lugs extending laterally from the sleeve, one on each side of the stop lug, to limit the movement of the hub relative to the sleeve.

In testimony whereof I have signed my name to this specification.

CHARLES E. HAMS.